May 8, 1951
H. SCHWARTZ ET AL
2,552,018
AUTOMATIC SPRING OPERATED SHUTTER AND
FLASH LAMP SYNCHRONIZER
Filed March 22, 1946
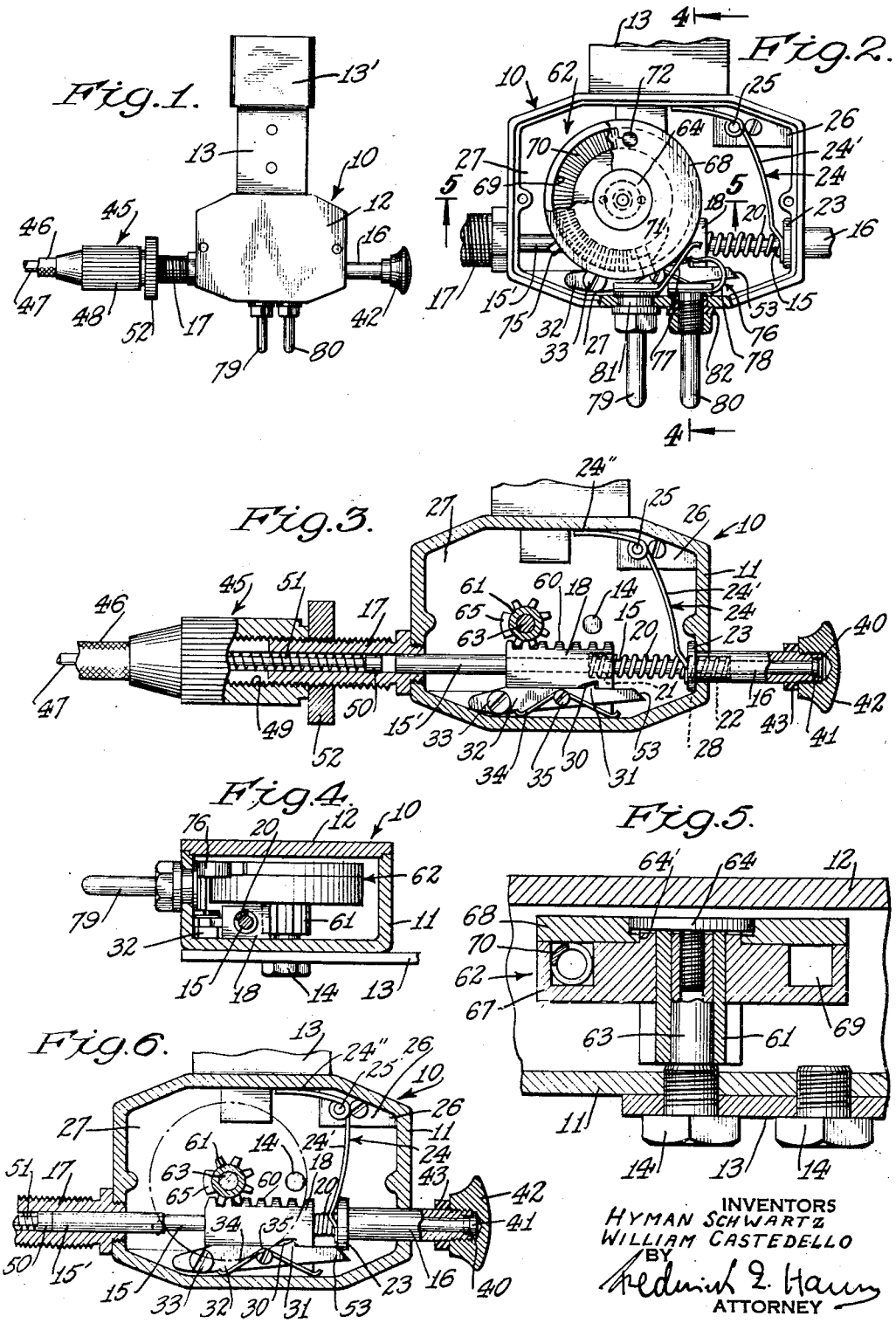
INVENTORS
HYMAN SCHWARTZ
WILLIAM CASTEDELLO
BY
ATTORNEY Patented May 8, 1951

2,552,018

UNITED STATES PATENT OFFICE 2,552,018

AUTOMATIC SPRING OPERATED SHUTTER AND FLASH LAMP SYNCHRONIZER

Hyman Schwartz and William Castedello, Stamford, Conn., assignors to The Kalart Company, Inc., Stamford, Conn.

Application March 22, 1946, Serial No. 656,180

10 Claims. (Cl. 95—11.5)

This invention relates to a camera shutter and flash lamp synchronizer, and more particularly to mechanical synchronizers for operating a camera shutter and firing a lamp at a selected time relationship with respect to each other.

For best results in the use of photoflash work, the operation of the camera shutter has to be properly timed and synchronized with the flash of the flash lamp so that during the time the shutter is substantially fully open, the photoflash lamp is producing its peak illumination. If the flash of the lamp and the camera shutter were not properly timed, unsatisfactory results are obtained as peak illumination may occur either before or after the shutter is fully opened. Proper timing of the shutter and flash lamp are of particular importance when the shutter is operated at high rates of speed, as is the case when the camera is used to take pictures of moving objects. Quickly acting shutters require considerable illumination of the objects to be photographed to attain sufficient density of the negative. Such strong illumination of the object can be attained only when peak illumination and full opening of the shutter coincide.

Flash lamps, as commonly used until recently, require an appreciable period of time to reach peak illumination. This period of time, herein sometimes referred to as "lamptime," may be equal to or even greater than the period of time, herein sometimes referred to as "shuttertime," required for the shutter to open fully after having been tripped.

More recent developments in the manufacture of flash lamps have resulted in lamps, so-called gaseous discharge lamps or tubes employing mercury and other vapors which will reach peak illumination practically instantaneously and develop a flash of extreme brilliancy and very short duration; a flash time of 1/30,000 of a second has been claimed. As a result the shuttertime becomes considerably longer than the lamp time when lamps or tubes of this type are employed.

One of the objects of this invention is a novel and improved synchronizer for synchronizing shuttertime and lamptime.

Another more specific object of the invention is a novel and improved synchronizer for use in conjunction with flash lamps the lamptime of which is shorter than the shuttertime.

Another object of the invention is to provide a novel and improved synchronizer by means of which a definite time relationship between peak illumination and full shutter opening is attainable.

Another object of the invention is to provide a novel and improved synchronizer which consists of comparatively few parts, is reliable and accurate in operation, and comparatively inexpensive in manufacture.

Other and further objects, features and advantages of the invention will appear hereinafter and in the appended claims forming part of the application.

In the accompanying drawing a now preferred embodiment of the invention is shown by way of illustration and not by way of limitation.

In the drawings:

Fig. 1 is a top plan view of a synchronizer according to the invention.

Fig. 2 is a top view of the synchronizer according to Fig. 1, the cover plate of the synchronizer casing being removed.

Fig. 3 is a top view of the synchronizer according to Fig. 1, the cover plate and part of the synchronizer mechanism being removed, certain parts of the mechanism being shown in section.

Fig. 4 is a sectional view along line 4—4 of Fig. 2.

Fig. 5 is a sectional view along line 5—5 of Fig. 2 on an enlarged scale, and

Fig. 6 is a top view of Fig. 1, the cover plate and part of the synchronizer mechanism being removed, certain parts of the mechanism being shown in section.

Referring now to the figures in detail, the synchronizer unit generally designated 10 comprises a casing 11 which houses the timing mechanism of the synchronizer. Casing 11 is closed by a cover plate 12 fastened to the casing by screws. The synchronizer unit can be fastened to a camera or accessories thereof by any suitable means. According to the now preferred embodiment, as shown on the drawings, a bracket 13 is fastened to the bottom of casing 11 by screws 14. This bracket has a portion 13' provided with guiding prongs or flanges which can be slipped over a corresponding bar fastened to the camera or an accessory thereof, such as a range finder.

The mechanical timing mechanism of the synchronizer unit comprises a plunger rod 15 having an enlarged section 15' integral with rod section 15 or rigidly fastened thereto. Rod 15 is passed through corresponding openings in the side walls of casing 11 and extends at both sides therefrom. The right hand end of the plunger rod is guided in a sleeve member 16 axially slidable in the corresponding opening in the side wall of the casing and the left hand end of the plunger rod is guided in a sleeve member 17 threaded in the corresponding opening in the opposite side wall of casing 11. A member 18 is slidably supported on rod section 15. The diameter of the hole of this member is smaller than the diameter of rod section 15' so that member 18 cannot slide over rod section 15' but will be arrested by the right hand edge thereof. A spiral spring 20 is coiled about rod section 15. The left hand end of the coil 20 abuts against member 18 and the right hand end against sleeve 16. To secure coil 20, the left end thereof is inserted in a corresponding recess 21 of member 18 and the right end of the spring in a corresponding recess 22 in sleeve 16. Spring 20 urges member 18 toward the left and against rod section 15' and sleeve 16 toward the right.

Movement of sleeve 16 toward the right is limited by a flange 23 fastened to the sleeve and pressed by spring 20 against the inside of the corresponding side wall of casing 11. The action of spring 20 in urging flange 23 against the inner side wall of casing 11 is supported by a single wire spring 24 which is coiled about a post 25 threaded into a block 26 fastened to the bottom 27 of casing 11. Leg 24' of the spring rests against flange 23, preferably in a groove 28 thereof, to prevent leg 24' from slipping off flange 23. The other leg 24'' of spring 24 abuts against one of the side walls of casing 11 (the top side wall as seen in Figs. 2, 3 and 6). As a result, spring 24 urges sleeve 16 always into the position shown in Fig. 3. At the bottom side of member 18 (as seen in Figs. 2, 3 and 6), there is provided a notch 30 which coacts with a nose 31 on a latch 32. This latch is pivoted about a pivot screw 33 fastened to bottom 27 of casing 11. A wire spring 34 is wound about a post 35 fastened to latch 32. The ends of the two legs of spring 34 abuts against the lower side wall (as seen in Figs. 3 and 6) of casing 11 so that the spring urges nose 31 of latch 32 always into engagement with notch 30 in member 18.

Sleeve 16 is extended slightly beyond the right hand end of rod section 15 and provided at its end with a recess 40 (see Fig. 3) in which is fitted a head portion 41 fastened to the end of rod section 15. A button 42 is threaded upon sleeve 16. As it will be apparent from the drawings and previous description, pressure exerted against button 42 toward the left (as seen in Fig. 3) will cause sleeve 16 to slide toward the left until head portion 41 abuts against the inside of button 42. Then, both, sleeve 16 and the plunger rod will be axially displaced toward the left. A collar 43 made for instance of rubber functions as a shock absorber when pressure is exerted upon button 42.

Section 15' of the plunger rod coacts with a cable release mechanism generally designated 45. The cable release mechanism may be of any suitable design, conventional or otherwise. According to the embodiment, as shown in Fig. 3, the cable release comprises a release cable 46 including a core 47. The release cable is operatively connected with the release button of a camera to be operated and will trip this shutter when core 47 is actuated. Release cable 46 terminates in a socket 48 having internal threads 49 engaging corresponding external threads of sleeve member 17. Core 47 terminates in a flange 50 which functions as an abutment for a spiral spring 51 coiled about core 47 and abuting with its other end against the bottom of socket 48. A locking member 52 is also threaded upon sleeve 17 and employed to lock socket 48 in place. Locking member 52 further serves to vary the distance between flange 50 and the left hand end of rod section 15', thereby varying the time at which the shutter will be tripped in response to an operation of the synchronizer unit, as will be more fully explained hereinafter.

Socket 48 and locking member 52 are preferably knurled to facilitate adjustment of these elements.

The parts of the synchronizer mechanism, as hereinbefore described, serve to trip the shutter when desired. The operation of these parts is as follows:

Let it be assumed that all parts are in positions, as shown in Fig. 3 which shows the normal or rest position of the synchronizer mechanism. When it is now desired to release the shutter, the operator presses button 42, thereby displacing sleeve 16 and with it flange 23 towards the left against the action of springs 20 and 24. As soon as button 42 has been moved sufficiently to engage the plunger rod, this rod is also moved toward the left and axially displaced relative to member 18. This member remains stationarily for the time being as it is locked by nose 31 engaging notch 30. As a result, spring 20 is compressed until all parts finally reach positions, as shown in Fig. 6. The movement of the plunger rod causes core 47 to be displaced which consequently initiates the shutter release movement. The various parts hereinbefore described are preferably so adjusted that in the position of the plunger rod, as shown in Fig. 6 the release button at the camera just reaches or closely approaches a position in which any further movement of the rod and hence of core 47 will result in tripping of the shutter. This latter position of the shutter release button is herein sometimes referred to as "trip point."

When button 42 is moved further toward the left, flange 23 will engage a slanted nose 53 (see Fig. 6) at latch 32 and swing the latch downwardly overcoming the opposite action of spring 34. As a result, nose 31 will be disengaged from notch 30 and the now released spring 20 will thrust member 18 toward the left, until abruptly stopped when the left hand edge of member 18 abuts against the left hand side wall of casing 11. As soon as member 18 engages the enlarged rod section 15', it will force the plunger rod and hence core 47 further towards the left, thereby releasing the shutter. Spring 20 is now substantially expanded, and loaded spring 24 will return sleeve 16 with button 42, the plunger rod and member 18 into positions as shown in Fig. 3 in which nose 31 re-engages notch 30.

Having described the actuation of the camera shutter by the synchronizer unit, the control of the flash lamp circuit in a predetermined time relationship to the shutter operation will now be explained in detail:

Member 18 is provided at its upper side (as seen on the drawings) with a number of teeth 60 to form a rack engaging a pinion 61. Pinion 61 is fastened to a flywheel generally designated 62. The flywheel and the pinion are rotatably supported by means of a stud 63 extending from the bottom of casing 11 and fastened thereto by threads and one of the screws 14, also serving to hold bracket 13 (see Fig. 5). Stud 63 penetrates flywheel 62 and has an inner thread at its upper end in which is threaded a head screw 64. Between the head of this screw and the body of the flywheel, there is provided a clearance 64' so that the flywheel with pinion 61 can freely rotate relative to stud 63. One of the teeth of pinion 61 may be filled in at 65 (see Fig. 3) to limit rotation of the flywheel as caused by teeth 60 of member 18.

Flywheel 62 comprises two sections 67 and 68. Section 67 is provided with a circumferential groove 69 in which is placed a coil spring 70. One end of this coil spring is fastened within groove 69 by means of a pin 71 or any other suitable means. The flywheel section 69 is disc-shaped and covers the open side of groove 69. The other end of spring 70 is fastened to flywheel section 68 by a post 72 or other suitable means. Flywheel section 68 supports a pin or nose 75 which coacts with switch or contact means, generally designated 76 (see Fig. 2). The switch or contact means comprise two contact arms 77 and 78 made of elastic material. These contact arms are so shaped that they are normally separated but moved into contact with each other when engaged by nose or pin 75. Contact arm 77 is connected to a plug 79 and contact arm 78 is connected to a second plug 80. Plugs 79 and 80 are insulated from casing 11 and each other by means of insulation bushings 81 and 82 respectively. It is of course also possible to connect one of the plugs to casing 11 directly. However, if gaseous discharge lamps of the type hereinbefore mentioned are used, it is preferable to insulate both plugs from the casing, as such lamps require a voltage of about 300 volts for operation.

Plugs 79 and 80 are connected in a conventional manner with the flash lamp circuit (not shown) so that a closing of switch means 76 causes a firing of the lamp.

The operation and control of the lamp circuit is as follows:

As previously described, a movement of the plunger rod and member 18 towards the left beyond the position shown in Fig. 6 will cause a rapid thrust of member 18 further to the left until member 18 is stopped by the left end wall of casing 11. This latter movement of member 18 will cause flywheel 62 to spin in clockwise direction. While the flywheel is rotated by the engagement between the rack at member 18 and pinion 61, both the sections of the flywheel will move together. As can best be seen from Fig. 2, coil spring 70 is arranged in such a manner that it tends to rotate flywheel section 68 in a counter-clockwise direction relative to flywheel section 67. The coil spring is substantially contracted either in the rest position of the mechanism or while the flywheel is spinning during movement of member 18. As soon as member 18 reaches the end of its sliding movement towards the left, rotation of pinion 61 is abruptly stopped, filled-in tooth 65 of the pinion being so positioned that it reaches a tooth 69 of member 18 substantially simultaneously with the stopping of this member. Flywheel section 67 will be stopped together with pinion 61, this fly wheel section being fastened to pinion 61. Flywheel section 68, however, will continue rotation in clockwise direction due to the force of inertia and against the action of coil spring 70 now being expanded by the inertia movement of section 68. After a certain inertia movement of flywheel section 68, nose 75 will engage and close switch means 76. As soon as the force of inertia is substantially exhausted, spring 70 will contract again and return flywheel section 68 and with it nose 75 into the position shown in Fig. 2. As will be apparent from the previous description, the number of revolutions or fractions thereof, (depending on the gear ratio between the rack and the pinion), as caused by the movement of member 18 is a constant one. The speed of the rotation of the flywheel is also constant, or at least always in a fixed time relationship to the speed of member 18. Furthermore, the speed and the distance of the inertia movement of flywheel 68 are constant. Consequently, the period of time which passes between release of member 18 for causing tripping of the shutter and the moment at which contacts 77 and 78 are closed to cause firing of the flash lamp is also a constant one. This period of time can be so selected as to allow the shutter to open substantially fully before the flash lamp is fixed. (As previously explained, the flash lamp reaches peak illumination practically instantaneously.)

As will be apparent, the period of time passing between release of member 18 and closing of switch means 76 can be varied by various means, for instance by adjusting the relative positions of nose 75 and contact arms 77 and 78, the strength of spring 70, the gear ratio between pinion and rack, or the strength of spring 20. A change of the strength of the latter spring will also affect the period of time passing between release of member 18 and the full opening of the shutter. The latter time can further be varied by adjustment of locking member 52. By employing one or more of these various means of adjustment the desired time relationship can always be obtained. Having now described the structure and operation of the synchronizer mechanism in detail, it will be apparent that the following sequence of operations will take place:

1. Manual movement of the various parts from the position, as shown in Fig. 3 into the position as shown in Fig. 6. This movement of parts is preparatory and can be used to place the release button at the camera in or near the "trip point" position. Any variation of the speed of this movement does not affect the synchronizing operation of the synchronizer.

2. Movement of member 18 from the position, as shown in Fig. 6 into a position in which the member rests against the left hand side of the casing. During this movement the shutter is tripped and begins to open. At the completion of the movement of member 18 the shutter may be fully opened or partly opened but in any event, it must be so adjusted that it will remain fully opened a certain period of time after completion of the movement of member 18.

3. Beginning of the inertia movement of flywheel section 68. This movement begins after the completion of the movement of member 18 and is so timed that it will be completed simultaneously with the shutter reaching full opening or while the shutter is still fully opened.

In the previous specification, the invention has been described in conjunction with a flash lamp. It should be noted in this connection that the usefulness of the invention is not limited to flash lamps of the type referred to, but that a synchronizer according to the invention can be employed for the control of any other suitable source of light.

While the invention has been described in detail with respect to a now preferred example and embodiment it will be understood by those skilled in the art after understanding the invention, various changes and modifications may be made without departing from the spirit and scope of the invention and it is intended therefore in the appended claims, to cover all such changes and modifications.

What is claimed as new and desired to be secured by Letters Patent is:

1. In a device for operating a camera shutter and a photoflash lamp in a predetermined time relationship to each other, in combination shutter release means, a manually movable plunger constructed and arranged to coact with the release means of the shutter for operating the same, a control member movable relative to the plunger and engageable with the same in a predetermined position relative to the plunger, spring means coacting with the control member for urging the same into engagement with the plunger, locking means coacting with the control member for locking the same against displacement by the action of the spring means, said spring means being arranged to be loaded by a movement of said plunger through a first predetermined distance relative to the control member, release means operative in response to a movement of the plunger through more than said first predetermined distance to release said locking means for causing the spring means to move the movable control member and said latter member to engage the plunger, thereby moving the same through a second predetermined distance, said second movement of the plunger causing the plunger to actuate the shutter release means, switch means for controlling a flash lamp circuit, a rotary member comprising two relatively rotatable portions, one of said portions being operatively connected with the movable member for rotation of said portion in response to and during movement of the movable control member, the second portion being yieldably connected with the first portion, said second portion being constructed to rotate together with the first portion and to continue rotation by inertia when the rotation of the first portion is terminated, and a control element supported on said second portion and constructed to actuate said switch means after a predetermined inertia movement of said second portion, thereby controlling the flash lamp circuit, said predetermined inertia movement being selected relative to the time of operation of the shutter so as to allow for substantially complete shutter opening before actuation of said switch means.

2. In a device for operating a camera shutter and a photoflash lamp in a predetermined time relationship to each other, shutter release means extending from said device to said camera shutter, a manually movable plunger rod constructed and arranged to coact with the release means of the shutter for operating the same, a control member slidable on the plunger rod and engageable with the same in a predetermined position of the member relative to the plunger rod, a spring engaging the control member for urging the same into engagement with the rod, a latch coacting with the control member and biased into a position locking the control member against displacement by the spring, the said spring being arranged to be loaded by a movement of said plunger rod for a predetermined distance relative to the control member, release means operative in response to a movement of said plunger rod through more than said predetermined distance to release said latch for causing the energy stored in said spring member to operate said slidable member to engage and further operate said plunger rod for actuation of said shutter release means by the plunger rod thereby tripping said camera shutter, switch means for controlling a flash lamp circuit, a rotary member comprising two relatively rotatable portions, one of said portions being operatively connected with the slidable member for rotation of the said portion in response to operation of the slidable member, the second portion being yieldably connected with the first portion, said second portion being constructed to rotate together with the first portion and to continue rotation by inertia when the rotation of the first portion is terminated, and a control element supported by said second portion and constructed to actuate said switch means after a predetermined inertia movement of said second portion, thereby controlling the flash lamp circuit, said predetermined inertia movement being selected relative to the time of operation of the shutter so as to allow for a substantially complete shutter opening before actuation of said switch means.

3. In a device for operating a camera shutter and a photoflash lamp in a predetermined time relationship to each other, in combination shutter release means, a movable plunger constructed and arranged to coact with the release means of the shutter for operating the same, a toothed control member movable relative to the plunger and engageable with the same in a predetermined position relative to the plunger, spring means coacting with the control member for urging the same into engagement with the plunger, locking means coacting with the control member for locking the same against displacement by the action of the spring means, said spring means being arranged to be loaded by a movement of said plunger through a first predetermined distance relative to the control member, release means operative in response to a movement of the plunger through more than said first predetermined distance to release said locking means for causing the spring means to move the movable member and said latter member to engage the plunger, thereby moving the same through a second predetermined distance, said second movement of the plunger causing the plunger to actuate the shutter release means, switch means for controlling a flash lamp circuit, a flywheel composed of two relatively rotatable sections, a pinion fastened to one of said sections and engaging the teeth of said movable member for rotation thereby, resilient means operatively connecting the second flywheel section with the first one, said resilient means being constructed and positioned to yield so as to permit the second flywheel section to continue rotation by inertia when the first flywheel section terminates its rotation in response to the termination of the movement of said movable member, and a projection extending from the second flywheel section and positioned to actuate said switch means after a predetermined inertia movement of the second flywheel section, thereby controlling the flash lamp circuit, said predetermined inertia movement being selected relative to the time of operation of the shutter so as to allow for a substantially complete shutter opening before actuation of said switch means.

4. In a device for operating a camera shutter and a photoflash lamp in a selected time relationship to each other, in combination shutter release means, a movable plunger constructed to operate the shutter release means, a movable member constructed to engage said plunger and provided with teeth, spring means arranged to coact with said second movable member, locking means to lock the movable member against action of the spring means, displacement of the plunger through a first predetermined distance causing storage of energy in said spring means, means operative in response to a movement of the plunger through more than said first predetermined distance to release said locking means for causing the spring means to move the movable member and said latter member to engage the plunger, thereby moving the same through a second predetermined distance, said second movement of the plunger causing the shuttler release means to be actuated, switch means for controlling a flash lamp circuit, a flywheel composed of two relatively rotatable sections, a pinion fastened to one of said sections and engaging the teeth of said movable member for rotation in response to a movement of the said member, one of said wheel sections having a circumferential groove, a spring placed in said groove, means for fastening one end of the said spring to one section and the other end to the other section, thereby yieldably connecting the two flywheel sections, the said spring being arranged to yield for continued rotation of the second flywheel section by inertia when the first flywheel section terminates its rotation in response to a termination of the movement of said movable member, and a projection extending from the second flywheel section positioned to engage and close said switch means upon said rotation of the second flywheel section due to inertia, thereby controlling the flash lamp circuit.

5. In a device of the type described for operating a camera shutter and a photoflash lamp in a predetermined time relationship to each other, a shutter release means extending from said device to said camera shutter, a plunger rod, a member slidable on said rod, said slidable member having teeth forming a rack, a spring coacting with said member for displacement of the same, manual displacement of said plunger rod through a first predetermined distance causing storage of energy in said spring, latch means for locking said slidable member against movement of the member relative to the rod by action of said spring, release means operative in response to a movement of said plunger rod through more than said first predetermined distance to release said latch means for causing the energy stored in said spring during the first predetermined movement of said plunger to be released to operate said slidable member to engage and further operate said plunger rod and to actuate said shutter release means for tripping said camera shutter, switch means for controlling a flash lamp circuit, a flywheel composed of two relatively rotatable sections, a pinion fastened to one of said sections and engaging said rack for rotation in response to an operation of the slidable member, one of said sections having a circumferential groove facing the other section, a coil spring placed in said groove, means for fastening one end of the coil spring to one section and the other end to the other section, thereby yieldably coupling the flywheel sections together, said coil spring being constructed to expand thus permitting the second flywheel section to continue its rotation by inertia when the first flywheel section terminates its rotation after the slidable member has completed its operating, and a nose at the second flywheel section positioned to engage and close said switch means after a predetermined inertia rotation by the second flywheel section, thereby controlling the flash lamp circuit, said predetermined inertia rotation by being selected relative to the time of operation of the shutter so as to allow for substantially complete shutter opening before actuation of said switch means.

6. In a device of the class described for operating a camera shutter and a photoflash lamp in a predetermined time relationship to each other, switch means for controlling a flash lamp circuit, a rotary member, and means for rotating the rotary member, said rotary member comprising two relatively rotatable portions, one of said portions being operatively connected with the rotating means for rotation of said portion by the rotating means, spring means fastened at one end to said first portion and at the other end to said second portion for yieldably connecting the said two portions, said second portion being constructed to rotate conjointly with the first portion and to continue rotation by inertia against the action of the spring means when the rotation of the first portion is terminated, and a control element controlled by said second portion and constructed to actuate said switch means after a predetermined inertia movement of said second portion, thereby controlling the flash lamp circuit.

7. In a device of the class described for operating a camera shutter and a photoflash lamp in a predetermined time relationship to each other, switch means for controlling a flash lamp circuit, a flywheel, and means for rotating the flywheel, said flywheel comprising two relatively rotatable portions, one of said portions being operatively connected with the rotating means for rotation of the flywheel by said means, spring means fastened at one end to the second flywheel portion and at the other end to the first flywheel portion, said spring means being constructed and positioned to yield thereby permitting the second flywheel portion to continue rotation by inertia against the action of the spring means when the rotation of the first flywheel portion is terminated in response to a termination of the movement of the rotating means, and a projection extending from the second flywheel portion and positioned to actuate said switch means after a predetermined inertia movement of the second flywheel portion, thereby controlling the flash lamp circuit.

8. A device as described in claim 4, wherein said flywheel comprises two substantially cylindrical sections, and a common axle rotatably supporting said two sections, one above the other.

9. A device as described in claim 4, wherein said flywheel comprises two substantially cylindrical sections, and a common axle rotatably supporting said two sections, one above the other, and wherein the flywheel section fastened to said pinion includes said circumferential groove.

10. In a device of the type described for operating a camera shutter and a photoflash lamp in a selected time relationship to each other, a control member mounted for movement from an inactive terminal position into an active terminal position, said control member being arranged to effect actuation of the release means of the shutter upon movement into its active terminal position, resilient means coacting with the control member and adapted to move the same into its active position, means coacting with said resilient means for loading the same to render the resilient means operative for the aforesaid purpose, locking means for locking the control member against movement of the loaded resilient means, release means for releasing the control member thereby causing the resilient means to become operative for movement of the control member, switch means for controlling a flash lamp circuit, a rotary member comprising two relatively rotatable portions, one of said portions being operatively connected with the movable member for rotation of said portion in response to and during movement of the movable control member, the second portion being yieldably connected with the first portion, said second portion being constructed to rotate together with the first portion and to continue rotation by inertia when the rotation of the first portion is terminated, and a control element supported on said second portion and constructed to actuate said switch means after a predetermined inertia movement of said second portion, thereby controlling the flash lamp circuit, said predetermined inertia movement being selected relative to the time of operation of the shutter so as to allow for substantially complete shutter opening before actuation of said switch means.

HYMAN SCHWARTZ.
WILLIAM CASTEDELLO.

REFERENCES CITED

The following references are of record in the file of this patent:

UNITED STATES PATENTS

| Number | Name | Date |
| --- | --- | --- |
| 2,238,115 | Johnson | Apr. 15, 1941 |
| 2,263,046 | Mendelsohn et al. | Nov. 18, 1941 |
| 2,299,497 | Rosenthal | Oct. 20, 1942 |
| 2,321,945 | Schwartz et al. | June 15, 1943 |
| 2,322,067 | Soreny | June 15, 1943 |
| 2,427,969 | Lester | Sept. 23, 1947 |
| 2,474,378 | Simmon et al. | June 28, 1949 |